(12) United States Patent
Anschutz

(10) Patent No.: US 8,615,168 B2
(45) Date of Patent: Dec. 24, 2013

(54) PON ONU CONFIGURED IN THE FORM OF A GIGABIT INTERFACE CONVERTER (GBIC)

(75) Inventor: Thomas Anschutz, Conyers, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 800 days.

(21) Appl. No.: 12/459,514

(22) Filed: Jul. 2, 2009

(65) Prior Publication Data

US 2011/0002690 A1 Jan. 6, 2011

(51) Int. Cl.
*H04J 14/00* (2006.01)
*H04B 10/00* (2013.01)

(52) U.S. Cl.
USPC .......................................... 398/67; 398/135

(58) Field of Classification Search
USPC ............................................. 398/66, 67, 135
See application file for complete search history.

(56) References Cited

U.S. PATENT DOCUMENTS

| | | | | |
|---|---|---|---|---|
| 6,647,210 B1 * | 11/2003 | Toyoda et al. | | 398/102 |
| 6,721,797 B1 * | 4/2004 | Kim | | 709/232 |
| 7,918,611 B2 * | 4/2011 | Hudgins et al. | | 385/92 |
| 8,155,526 B2 * | 4/2012 | Gray | | 398/116 |
| 2006/0269290 A1 * | 11/2006 | Greenspan | | 398/140 |
| 2007/0109974 A1 * | 5/2007 | Cutillo et al. | | 370/254 |
| 2007/0153823 A1 * | 7/2007 | Wojtowicz | | 370/463 |
| 2009/0060509 A1 * | 3/2009 | Shimoosako et al. | | 398/66 |
| 2009/0154930 A1 * | 6/2009 | Hinderthuer | | 398/83 |
| 2009/0214221 A1 * | 8/2009 | Li et al. | | 398/136 |

* cited by examiner

*Primary Examiner* — M. R. Sedighian
*Assistant Examiner* — Abbas H Alagheband

(57) ABSTRACT

A Passive Optical Network (PON) component, such as a Gigabit Interface Converter (GBIC) or similar pluggable transceiver, provides the combined functionality of the GBIC (or similar device) and an Optical Network Unit (ONU). The result is a device with a reduced form factor by eliminating redundant components and simplified fault management of the end-system.

18 Claims, 5 Drawing Sheets

PON ONU CONFIGURED IN THE FORM OF A GIGABIT INTERFACE CONVERTER (GBIC)

FIELD OF THE DISCLOSURE

The present invention relates generally to Optical Networking, and more particularly, to Passive Optical Networking utilizing a Passive Optical Network (PON) transceiver such as a Gigabit Interface Converter (GBIC) or similar transceiver, and to a network architecture and method for transmitting communications signals through a communications network.

BACKGROUND

Communications service providers are continuously being pressed by users to increase network capacity. Commonplace services now include Voice over Internet Protocol (VoIP), high-bandwidth on-demand audio and video, and high-bandwidth data connections to private or public networks, such as the Internet. The development of optical fiber communication technologies has enabled exponential growth in the capacity of backbone networks, with Passive Optical Networks (PONs) and specifically Gigabit Passive Optical Networks (GPONs) proposed as a flexible broadband infrastructure for delivering cost effective and environmentally friendly/energy efficient telecommunications services including voice, video and data to homes and businesses.

FIG. 1 shows a prior art PON architecture 100 of a PON providing access to subscribers/customers as a loop technology, as is known by those skilled in the art. In this network architecture, an Optical Line Terminal (PON OLT) 102 optical transceiver at a service provider's central office (CO) 104, connected via Optical Fiber 106 to a Remote Node 108 containing a passive optical splitter 110 located in the vicinity (neighborhood) of multiple customers. The fiber 112 may then be connected to an Optical Network Unit (ONU) 114. ONUs interface optical signals to electrical signals, such as an Unshielded Twisted Pair (UTP) in a telecommunications network, an example of which is a Digital Subscriber Line (DSL) including its variants, or a coaxial cable in a cable network. As such, the electrical signals can then be sent to the appropriate Customer Premises (CP) 116, 118. Alternatively, optical signals can be sent directly from the Remote Node 108 containing a passive optical splitter 110 via optical fiber 120 to a Customer Premises/Optical Network Unit (CP/ONU) 122. The ONU in this context is an addressable device that recognizes and accepts only downstream data addressed specifically to it. Exemplary CPs as shown in FIG. 1 are depicted as home/individual users, however similar architectures apply to small business and larger enterprise users as their service agreements and/or network designs permit.

FIG. 2 shows a prior art PON architecture 200 providing trunking to another type of network element, such as a Digital Subscriber Line Access Multiplexer (DSLAM). In this network architecture, as with the network of FIG. 1, an Optical Line Terminal (PON OLT) 202 optical transceiver at a service provider's central office (CO) 204, is connected via Optical Fiber 206 to a Remote Node 208 containing a passive optical splitter 210 located in the vicinity (neighborhood) of multiple customers. The fiber 212 may then be connected to an ONU 214. At this point the network architectures differ from that of FIG. 1, in that the fiber 213 connects via a Gigabit Interface Converter (GBIC) to DSLAM 215 which provides optical/electrical signal interface and multiplexing functionality, and makes the connection to the appropriate DSL modem at Customer Premises (CP) 216, 218 and 222.

The PON architectures described above eliminate the requirement for optical-to-electrical-to-optical (OEO) conversion at each node of the fiber optic network by employing passive optical components such as beam splitters and filters at network nodes instead of active optical components. By eliminating the active optical components associated with an active optical network, less hardware/software is required, which in turn reduces active network management by a network administrator, and reduces energy consumption of the associated components. PON architecture, therefore, is cost effective and environmentally friendly/energy efficient solution when compared to active fiber optic networks.

The term Gigabit Interface Converter (GBIC) refers to both a standard for transceivers and to a device for interfacing network devices to a fiber optic based transmission system such as fiber channel or other high speed non-optical based system(s) and to a Gigabit Ethernet. The GBIC is just one example of the pluggable transceivers defined by a growing number of form factor and interfacing standards. Other standards in use today include the Small Form-Factor Pluggable (SFP) specification, the 10 Gigabit Small Form Factor Pluggable (XFP) specification, the XFI 10 gigabit per second chip-to-chip electrical interface specification (XFI) and the XENPAK Multisource Agreement (MSA), The GBIC device converts serial electrical signals to serial optical signals and visa versa. GBIC modules are generally hot swappable; that is, they can be inserted and removed from a host or switch chassis without powering off the receiving socket, and contain device identification and configuration information that a host or switch can use to determine the device's capability. As a plug-in module, the GBIC includes physical pins or card edge contacts that form a single pluggable interface that provides both signal connections and power connections between the GBIC and the host. The GBIC enables network designers and administrators to cost effectively deploy and upgrade network capability as justified by increased network traffic, capital budgets and as technology advances are made.

The term "pluggable transceiver," as used in this specification, refers to a pluggable device that connects a host device with a communications medium such as short-distance fiber, long-distance fiber or copper. From the host device perspective, the connection conforms to a communications standard such as Gigabit Ethernet, SONET or Fibre Channel. A pluggable transceiver differs from a router line card or router blade in several ways, one being that the pluggable transceiver is intended to plug in to a variety of devices and cards from a variety of suppliers; whereas the line card is designed for a particular router and supports a limited number of higher-layer protocols, like Frame Relay, ATM, Ethernet, or SONET. Moreover, the router line card has firmware and management capabilities that must be coordinated with the router firmware, whereas the pluggable transceiver is largely independent of the router firmware. The term "independent," as used here, means that software/firmware in the pluggable transceiver performs the same tasks in the same way regardless of what software/firmware is running in the router or other network equipment, and need not be changed according to the software/firmware running in the router or other network equipment.

The appeal of the GBIC standard in networking equipment, as opposed to fixed physical interface configurations, is its flexibility. Where multiple different optical technologies are in use, a network designer or administrator can deploy GBICs as needed, not in advance, in the specific type needed for each link. The term GBIC will be used in this application to broadly describe the current definition of the standard/device, and include variations such as the mini-GBIC, SFP, XFI/XFP and others.

All networks, including PONs comprising network devices such as ONUs, require a level of network monitoring and management to facilitate efficient, effective and reliable operation. A Network Management System (NMS) typically employs a combination of hardware and software to monitor and administer a network.

SUMMARY OF THE INVENTION

In accordance with an aspect of the present disclosure there is provided a pluggable transceiver for use in connecting a passive optical network (PON) with trunking to other network equipment, the PON including an optical line terminal (OLT) configured for granting upstream transmission permissions to a plurality of optical networking units (ONUs). The pluggable transceiver comprises: an optical fiber connector for transmitting and receiving optical signals through an optical fiber of the PON; an optical networking unit (ONU) containing computer-executable instructions thereon for controlling transmission on the optical fiber in accordance with permissions received from the OLT; and a pluggable interface for carrying signals between the transceiver and the other networking equipment and for providing power from the other networking equipment to the pluggable transceiver.

The other network equipment may be a digital subscriber line access multiplexer (DSLAM). The other network equipment may be a network element selected from the group consisting of: a customer router, a network router, a customer switch and a network switch. The pluggable transceiver may further comprise an optical to electrical converter for converting an optical signal from the optical fiber to an electrical signal.

The transceiver may conform to SFF-8053 Specification for GBIC (Gigabit Interface Converter), rev. 5.5. The pluggable transceiver may be hot swappable. The pluggable transceiver may be for connecting a Gigabit Ethernet network-capable device to a PON.

In accordance with another aspect of the present disclosure there is provided a communications network architecture. The architecture comprises: a passive optical network (PON) including an optical line terminal (OLT) configured for granting upstream transmission permissions to optical networking units (ONUs); a digital subscriber line access multiplexer (DSLAM) connected for multiplexing signals on a plurality of digital subscriber lines (DSLs); and a pluggable transceiver installed in the DSLAM, the pluggable transceiver including an optical fiber interface and an optical to electrical signal conversion unit for converting optical signals received through the optical fiber interface to electrical signals for transmission to the DSLAM. The pluggable transceiver further comprises an ONU for receiving and implementing upstream transmission permissions from the OLT.

The pluggable transceiver may further comprise an optical to electrical converter for converting an optical signal from the optical fiber (such as a PON signal) to an electrical signal required by the network equipment (such as an Ethernet signal). The pluggable transceiver and the ONU may be powered by a single power supply within the DSLAM. The pluggable transceiver may be hot swappable. The pluggable transceiver may be a transceiver meeting standards selected from a group consisting of Gigabit Interface Converter (GBIC) standard, Small Form-Factor Pluggable (SFP) standard, 10 Gigabit Small Form Factor Pluggable (XFP) standard, XFI 10 gigabit per second chip-to-chip electrical interface specification (XFI) and XENPAK Multisource Agreement (MSA).

In accordance with yet another aspect of the disclosure there is provided method for transmitting a communications signal through a passive optical network (PON) from a second network. The method comprises the steps of: receiving in a pluggable transceiver installed in network equipment of the second network, from an optical line terminal (OLT) within the passive optical network, an upstream transmission permission; receiving in the pluggable transceiver a communications signal from the second network to be transmitted through the PON; and transmitting the communications signal from the pluggable transceiver through the PON in accordance with the upstream transmission permission.

The method may further comprise the step of: in the pluggable transceiver, converting the communications signal from the second network to an optical signal for transmission through the PON.

The pluggable transceiver may be a transceiver meeting standards selected from a group consisting of Gigabit Interface Converter (GBIC) standard, Small Form-Factor Pluggable (SFP) standard, 10 Gigabit Small Form Factor Pluggable (XFP) standard, XFI 10 gigabit per second chip-to-chip electrical interface specification (XFI) and XENPAK Multisource Agreement (MSA).

The pluggable transceiver may comprise an optical networking unit (ONU), in which case the pluggable transceiver and the PON may be powered using a common power supply. The pluggable transceiver may be hot swappable.

The second network may comprise a digital subscriber line (DSL) network and the network equipment may comprise a digital subscriber line access multiplexer (DSLAM).

These aspects of the invention and further advantages thereof will become apparent to those skilled in the art as the present invention is described with particular reference to the accompanying drawings.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

Figure 3:
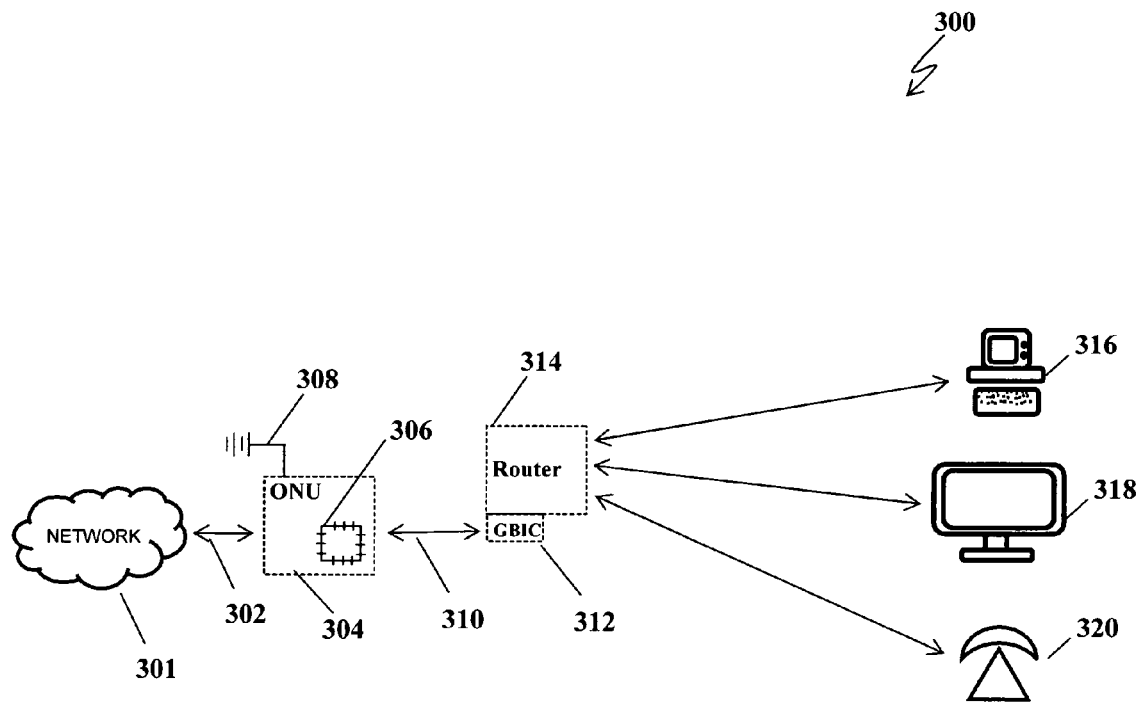
FIG. 3 shows a prior art network architecture of separate ONU and GBIC devices with a PON.

FIG. 3 shows a prior art network architecture 300 of separate ONU and GBIC devices within a PON. The fiber optic cable 302 interfaces with a communications network 301 which may be public, such as the Internet or a private network, and the PON ONU 304 with functionality as is known by those skilled in the art. The PON ONU 304 may implement its functionality via conventional means by utilizing multiple discrete components, or in emerging System on a Chip (SOC) 306 based systems. The ONU 304 requires power, which will typically be provided by a discrete power adapter or transformer 308. ONU 304 interfaces via gigabit or fast Ethernet fiber connector 310 with a GBIC device 312 or a standard port as part of a customer switch, router or DSLAM 314. To assure device performance and demonstrate compliance with Service Level Agreements (SLAs), a NMS (not shown) for various components, such as the ONU 304, GBIC 312 and switch, router or DSLAM 314 may be employed, requiring set-up, maintenance and monitoring by a network administrator. Finally, high speed data connections are made to a computer or similar device 316, high speed audio/video connections are made to a High Definition Internet Protocol Television 318, and connections are made enabling Voice over Internet Protocol (VoIP) telephone service 320, via their respective protocols and connection technologies, as are well known by those skilled in the art.

Figure 1:
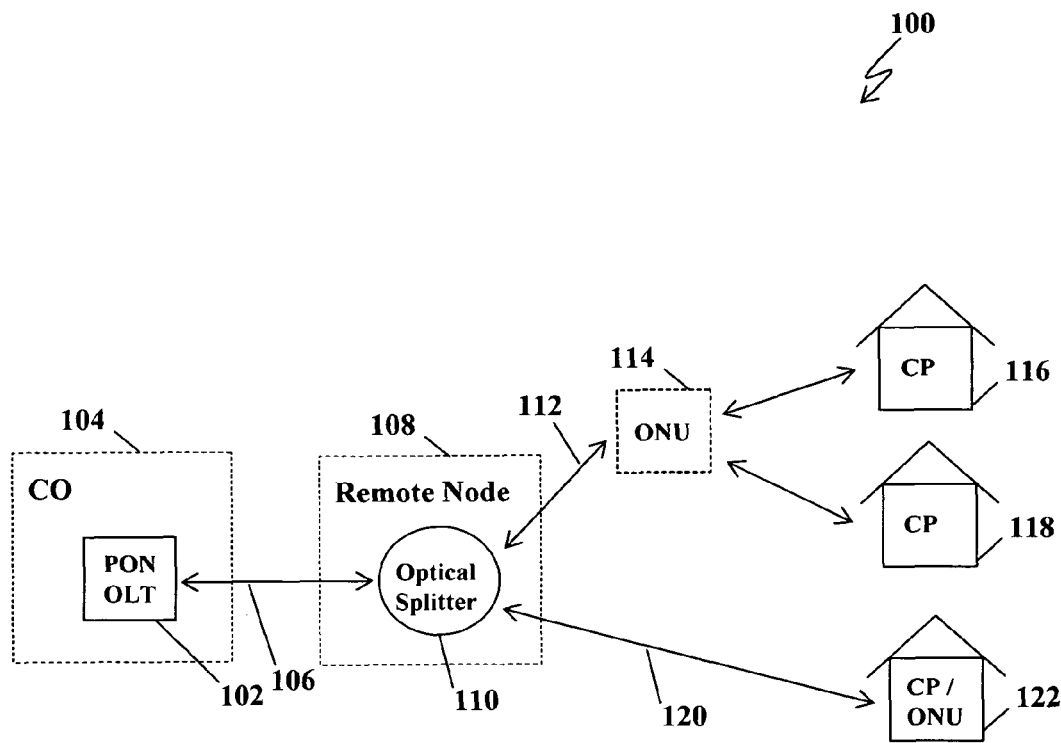
FIG. 1 shows a prior art PON architecture to provide access to subscribers/customers as a loop technology.

A PON is a shared network, in that the OLT (as described by 102 of FIG. 1 and 202 of FIG. 2) sends a single stream of downstream traffic that is seen by all ONUs coupled to it. Each ONU, however, only reads the content of those packets that are addressed to it. Encryption may be used to prevent eavesdropping of other downstream traffic.

The OLT is also responsible for allocating upstream bandwidth to individual ONUs and therefore to individual subscribers/customers. Upstream traffic must be managed or transmissions could collide if they were transmitted at random times. ONUs can be placed at varying distances from the OLT, which creates a transmission delay from each ONU to its OLT. To avoid collisions, the transmission timing of each ONU is determined by its associated OLT to equalize the delay with respect to all of the other ONUs on the PON.

With the delays of all the ONUs determined, the OLT transmits so-called grants to the individual ONUs. A grant is permission to use a defined interval of time for upstream transmission. The grant map or permission is dynamically re-calculated every few milliseconds, and allocates bandwidth to all ONUs, such that each ONU receives timely bandwidth for its service needs.

Figure 4:
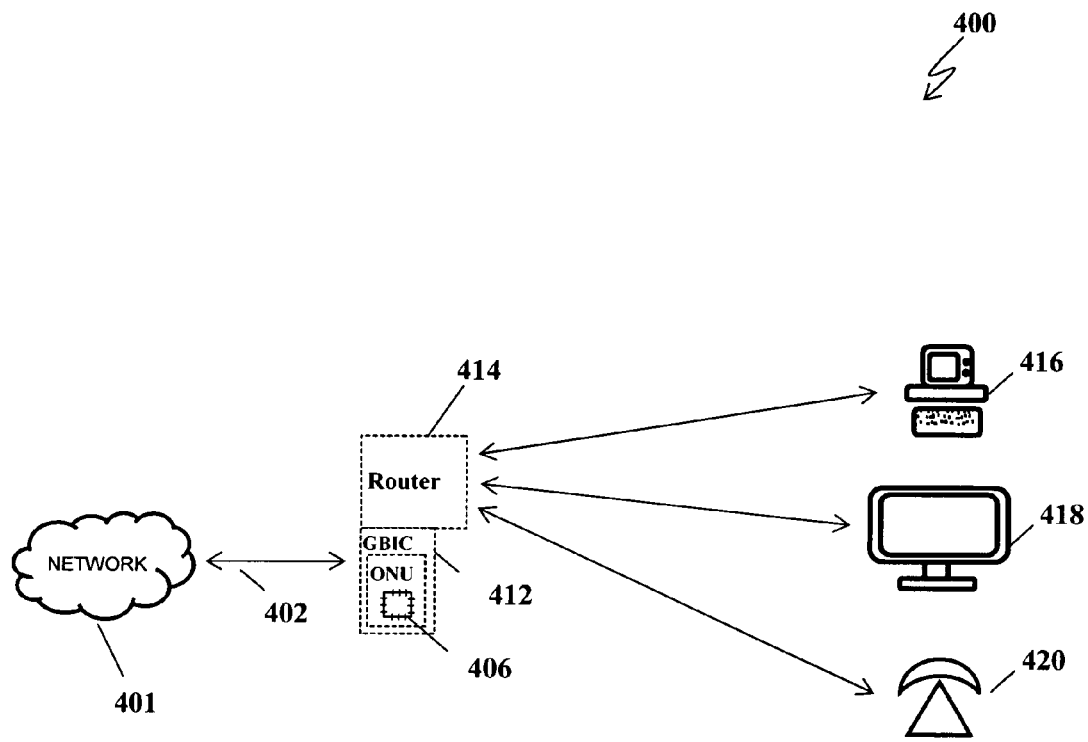
FIG. 4 shows a PON architecture in accordance with one aspect of the disclosure, with a pluggable transceiver providing the combined functionality of the GBIC and an ONU.

FIG. 4 shows an embodiment 400 of a PON architecture in accordance with one aspect of the present disclosure, with a pluggable transceiver 412 providing the combined functionality of the GBIC (or similar device) and an Optical Network Unit (ONU).

The fiber optic cable 402 is part of a PON that includes an OLT in the communications network 401. The pluggable transceiver 412 is installed in network equipment 414 such as a customer router, a customer switch, network switch, or a DSLAM.

Known GBIC transceivers operate at one or more physical layers, providing little more than optical to electrical signal conversion. The electrical signal is simply "modulated" into an optical signal and vice versa. For that reason, a GBIC can be used with devices utilizing different protocols without special adaptation.

In contrast, the pluggable transceiver 412 has an added functionality: the ONU functionality of interfacing with the fiber circuit 402, including negotiating transmission permissions with the OLT, and other functionality, is embedded in and performed by the GBIC device 412. The ONU functionality performs adaptation of a given type of signal (such as Ethernet, ATM or DS3) to a different (PON) signal. That adaptation is more complex than the simple physical layer adaptation that is typically done by a GBIC.

In one example, the physical layer adaptation is static, wherein the GBIC device 412 supports only a Gigabit Ethernet (GigE) port application, or supports only an ATM/DS3 port application. In another example, the physical layer adaptation is dynamic, wherein the GBIC device 412 supports multiple protocols by detecting the protocol upon plug-in and adapting "on the fly." In that way, a single unit adapts to GigE when plugged into a GigE port, and supporting ATM/DS3 when plugged into a ATM/DS3 port.

In the embodiment shown in FIG. 4, the embedded ONU functionality is implemented by an exemplary System on a Chip (SOC) 406 technology. In an alternative embodiment (not shown), the functionality may be implemented by more conventional means utilizing multiple discrete components. The received data signals from the fiber 402 are transmitted by the network equipment 414 through high speed data connections to a computer or similar device 416, through high speed audio/video connections to a High Definition Internet Protocol Television 418, and through connections enabling Voice Over Internet Protocol (VoIP) telephone service 420, via their respective protocols and connection technologies, as are well known by those skilled in the art.

Figure 2:
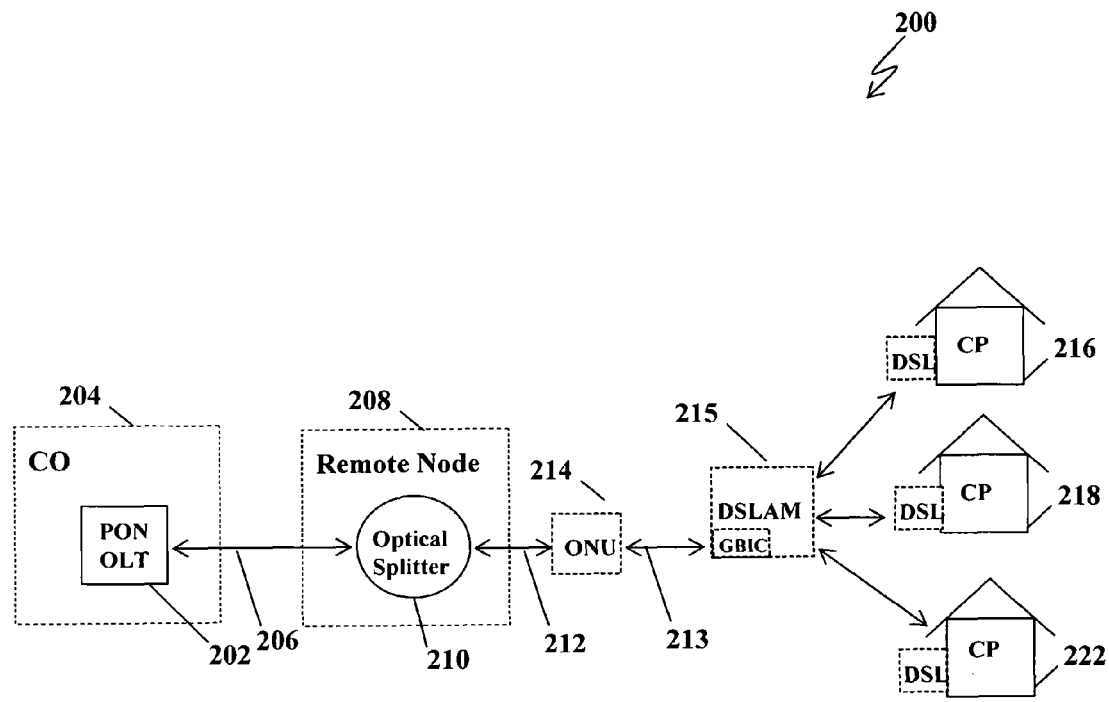
FIG. 2 shows a prior art PON architecture providing trunking to another network element.
Figure 5:
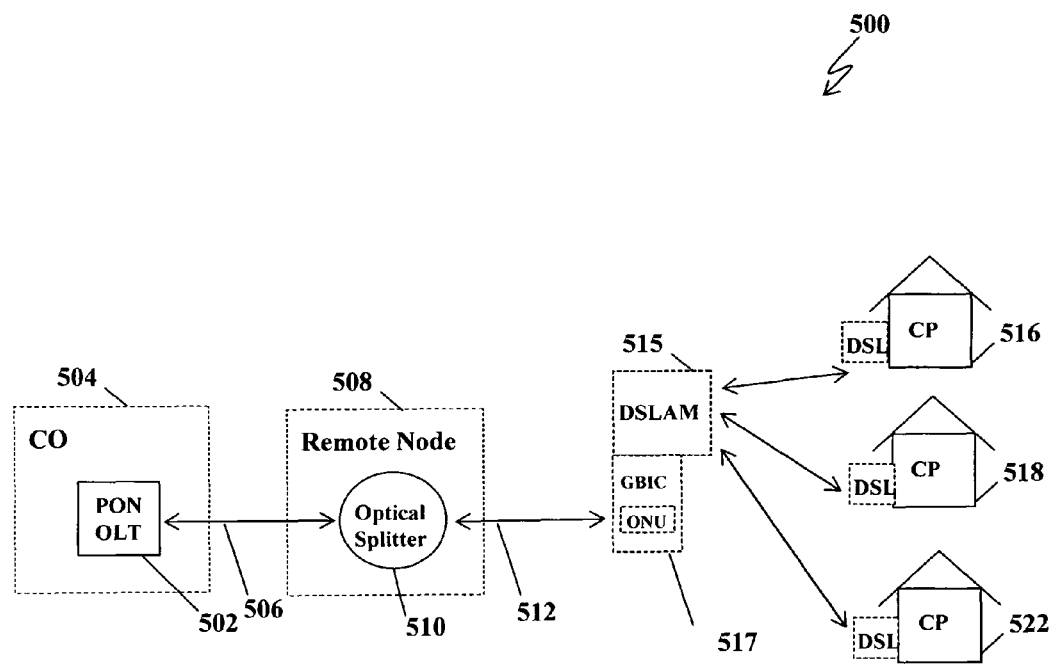
FIG. 5 shows a PON architecture in accordance with another aspect of the disclosure, to provide trunking to another type of network element.

FIG. 5 shows an embodiment 500 of a PON architecture in accordance with another aspect of the present disclosure, to provide trunking to another type of network element, such as a Digital Subscriber Line Access Multiplexer (DSLAM). In this network architecture, as with the network of FIG. 1 and FIG. 2, an Optical Line Terminal (PON OLT) 502 optical transceiver at a service provider's central office (CO) 504, connected via Optical Fiber 506 to a Remote Node 508 containing a passive optical splitter 510 located in the vicinity (neighborhood) of multiple customers. The fiber 512 may then be connected to a pluggable transceiver 517 that performs the functions of the PON and the GBIC. The transceiver 517 is plugged into the DSLAM 515. As such, a separate ONU and GBIC are combined into one device providing the joint functionality of the two devices, eliminating component and interconnect redundancy, as well as the need to separately power the ONU. Specifically, the combination eliminates two physical interfaces (for example, as shown in FIG. 2, the interfaces between the line 213 and the ONU 214 and between the line 213 and the DSLAM 215) and eliminates a line (the line 213 of FIG. 2). Those elements are replaced with internal functions that are not subject to fiber cuts or transmission errors. Because the interfaces are internal, there is no need to monitor and manage those network components.

In the embodiment shown in FIG. 5, the DSLAM 515 is connected to the appropriate DSL modems at Customer Premises (CP) 516, 518 and 522 is made.

A significant benefit of the present invention is the reduced form factor of the pluggable transceiver that performs the functions of the PON and the GBIC. This is largely accomplished by eliminating the physical housing of the ONU (214 of FIG. 2 and 304 of FIG. 3), eliminating the redundant optical/electrical interface(s) (213 of FIG. 2 and 310 of FIG. 3) and eliminating the associated power supply/power management circuitry (308 of FIG. 3). Energy efficiency of a device with fewer components and a larger degree of integration are also favorable to customers interested in understanding and reducing their environmental impact. A smaller form factor allows the GBIC or similar devices to be placed with a higher density into existing cabinets and/or allow a similar number of GBIC or similar devices to be placed in a smaller/less obtrusive cabinet. As with many optical/electrical/mechanical systems, when component count and physical footprint are reduced, additional benefits of improved reliability and lowered manufacturing, operational and maintenance cost may also be realized.

The functions of the GBIC, including hot-swapability and transceiver functions, may be performed in the same processor as the ONU functions such as negotiating of transmission permissions. The combined processor or processors contribute to the efficiency of the pluggable transceiver 517.

A Network Management System (NMS) for various components, such as the ONU 304, GBIC 312 and switch, router or DSLAM 314, all of FIG. 3, may be employed to assure device performance and demonstrate compliance with Service Level Agreements (SLAs). The present invention eliminates a discrete ONU by integrating it into the GBIC. The resultant NMS is thus simplified, requiring less resources to set-up, maintain and monitor by a network administrator.

In summary, the present disclosure describes a PON component, such as a Gigabit Interface Converter (GBIC) or similar, providing the combined functionality of the GBIC (or similar device) and an Optical Network Unit (ONU). The result is a device with a reduced form factor by eliminating redundant components, such as power supplies and interconnecting cables, and simplified fault management of the end-system.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

I claim:

1. A pluggable transceiver for use in connecting a passive optical network to a digital subscriber line access multiplexer, the passive optical network including an optical line terminal configured for granting upstream transmission permissions to a plurality of optical networking units, the pluggable transceiver comprising:
   an optical fiber connector for transmitting and receiving optical signals through an optical fiber of the passive optical network;
   an optical networking unit containing computer-executable instructions thereon for controlling transmission on the optical fiber in accordance with permissions received from the optical line terminal;
   a pluggable interface for carrying signals between the transceiver and the digital subscriber line access multiplexer and for providing power from the digital subscriber line access multiplexer to the pluggable transceiver, the pluggable interface comprising firmware that is independent of firmware installed in the digital subscriber line access multiplexer;
   the pluggable transceiver further comprising a processor and non-transitory computer readable media having computer readable instructions stored thereon that, when executed by the processor, cause the processor to:
   detect, upon plug-in of the pluggable transceiver in the other network equipment, a port application of the other network equipment;
   dynamically adapt the pluggable transceiver to support the port application of the digital subscriber line access multiplexer;
   and communicate, via the pluggable interface and a multiplexing functionality of the digital subscriber line access multiplexer, with a plurality of customer premises digital subscriber line modems.

2. The transceiver of claim 1, wherein the pluggable transceiver further comprises an optical to electrical converter for converting an optical signal from the optical fiber to an electrical signal.

3. The transceiver of claim 1, wherein the pluggable transceiver further comprises a converter for translating a signal protocol between a passive optical network and an Ethernet.

4. The transceiver of claim 1, wherein the pluggable transceiver is hot swappable.

5. A method for transmitting communications signals to a passive optical network from a plurality of customer premises digital subscriber line modems, the method comprising:
   detecting, upon plug-in of a pluggable transceiver in a digital subscriber line access multiplexer, a port application of the digital subscriber line access multiplexer;
   dynamically adapting the pluggable transceiver to support the port application of the digital subscriber line access multiplexer;
   receiving through an optical fiber connector of the pluggable transceiver, from an optical line terminal within the passive optical network, an upstream transmission permission;
   receiving through a pluggable electrical interface of the pluggable transceiver, a multiplexed communications signal comprising the communications signals from the plurality of customer premises digital subscriber line modems; and
   transmitting the multiplexed communications signal from the pluggable transceiver through the optical fiber connector to the passive optical network in accordance with the upstream transmission permission.

6. The method of claim 5, further comprising:
   in the pluggable transceiver, converting the multiplexed communications signal from the second network to an optical signal for transmission through the passive optical network.

7. The method of claim 5, wherein the port application of the network equipment conforms to a standard selected from a group consisting of gigabit interface converter standard, small form-factor pluggable standard, 10 gigabit small form factor pluggable standard, XFI 10 gigabit per second chip-to-chip electrical interface specification and XENPAK multi-source agreement.

8. The method of claim 5, wherein the pluggable transceiver comprises an optical networking unit.

9. The method of claim 8, further comprising:
   powering the pluggable transceiver and the passive optical network using a common power supply.

10. The method of claim 8, wherein the pluggable transceiver is hot swappable.

11. The method of claim 5, wherein the second network comprises a digital subscriber line network and the network equipment comprises a digital subscriber line access multiplexer.

12. A non-transitory computer readable medium having computer readable instructions stored thereon that, when executed by a processor, cause the processor to perform a method for transmitting communications signals to a passive optical network from a plurality of customer premises digital subscriber line modems, the method comprising:
- detecting, upon plug-in of a pluggable transceiver in a digital subscriber line access multiplexer, a port application of the digital subscriber line access multiplexer;
- dynamically adapting the pluggable transceiver to support the port application of the digital subscriber line access multiplexer;
- receiving through an optical fiber connector of the pluggable transceiver, from an optical line terminal within the passive optical network, an upstream transmission permission;
- receiving through a pluggable electrical interface of the pluggable transceiver, a multiplexed communications signal comprising the communications signals from the plurality of customer premises digital subscriber line modems; and
- transmitting the multiplexed communications signal from the pluggable transceiver through the optical fiber connector to the passive optical network in accordance with the upstream transmission permission.

13. The non-transitory computer-usable medium of claim 12, wherein the method further comprises:
in the pluggable transceiver, converting the multiplexed communications signal from the second network to an optical signal for transmission through the passive optical network.

14. The non-transitory computer-usable medium of claim 12, wherein the port application of the network equipment conforms to a standard selected from a group consisting of gigabit interface converter standard, small form-factor pluggable standard, 10 gigabit small form factor pluggable standard, XFI 10 gigabit per second chip-to-chip electrical interface specification and XENPAK multisource agreement.

15. The non-transitory computer-usable medium of claim 12, wherein the pluggable transceiver comprises an optical networking unit.

16. The non-transitory computer-usable medium of claim 15, wherein the method further comprises:
powering the pluggable transceiver and the passive optical network using a common power supply.

17. The non-transitory computer-usable medium of claim 15, wherein the pluggable transceiver is hot swappable.

18. The non-transitory computer-usable medium of claim 12, wherein the second network comprises a digital subscriber line network and the network equipment comprises a digital subscriber line access multiplexer.

* * * * *